(12) United States Patent
Cordero et al.

(10) Patent No.: US 10,006,203 B2
(45) Date of Patent: Jun. 26, 2018

(54) CABLES LIFT SYSTEM FOR VERTICAL PRE-STRESSING

(71) Applicants: Alejandro Cortina Cordero, Ciudad de México (MX); Jose Pablo Cortina Cordero, Ciudad de México (MX); Jose Pablo Cortina Ortega, Ciudad de México (MX)

(72) Inventors: Alejandro Cortina Cordero, Ciudad de México (MX); Jose Pablo Cortina Cordero, Ciudad de México (MX); Jose Pablo Cortina Ortega, Ciudad de México (MX)

( * ) Notice: Subject to any disclaimer, the term of this patent is extended or adjusted under 35 U.S.C. 154(b) by 0 days. days.

(21) Appl. No.: 14/981,741

(22) Filed: Dec. 28, 2015

(65) Prior Publication Data

US 2017/0183872 A1 Jun. 29, 2017

(51) Int. Cl.

| | | |
|---|---|---|
| *E04H 12/16* | (2006.01) | |
| *E04H 12/34* | (2006.01) | |
| *B66C 23/18* | (2006.01) | |
| *E04C 5/08* | (2006.01) | |
| *E04C 5/12* | (2006.01) | |
| *F03D 13/20* | (2016.01) | |
| *B66C 11/06* | (2006.01) | |
| *B66C 11/12* | (2006.01) | |

(52) U.S. Cl.
CPC ............... *E04C 5/08* (2013.01); *B66C 11/06* (2013.01); *B66C 11/12* (2013.01); *E04C 5/122* (2013.01); *E04H 12/16* (2013.01); *E04H 12/341* (2013.01); *F03D 13/22* (2016.05)

(58) Field of Classification Search
CPC ....... E04H 12/16; E04H 12/12; E04H 12/344; E04H 12/342; E04H 12/341; E04G 3/32; B66C 11/04; B66C 11/06; B66C 11/12; B66C 23/207; B66C 23/185
See application file for complete search history.

(56) References Cited

U.S. PATENT DOCUMENTS

| | | | | |
|---|---|---|---|---|
| 1,834,842 | A * | 12/1931 | Houghtaling | E04H 7/28 52/192 |
| 4,045,929 | A * | 9/1977 | Velo Dalbrenta | E04H 7/20 52/223.2 |

(Continued)

FOREIGN PATENT DOCUMENTS

| | | | | |
|---|---|---|---|---|
| DE | 102011090194 A1 * | 7/2013 | | E04H 12/08 |
| DE | 102012106321 A1 * | 1/2014 | | E04H 12/04 |

(Continued)

*Primary Examiner* — Christine T Cajilig
(74) *Attorney, Agent, or Firm* — Karim Lagobi

(57) ABSTRACT

It is described an assembly for lifting pre-stressing cables for a pre-stressed concrete structure having ducts for pre-stressing cables, to be arranged on top of the concrete structure, comprising: (a) a rail 22 on which a hoist or pulley 30 is arranged, which has wheels, which allow hoist 30 to move along the rail 22; (b) a supporting structure 12, attached to rail 22; (c) a plurality of columns 14, which supports the supporting structure 12 of the rail 22, arranged at a certain distance from the rail; and (d) an hoists 30 having a chain 34 which is inserted into the vertical ducts 52 for the pre-stressing cables of the concrete structure, and uploads the wires to the top of the structure.

14 Claims, 7 Drawing Sheets

(56) References Cited

U.S. PATENT DOCUMENTS

| | | | | |
|---|---|---|---|---|
| 4,092,811 | A * | 6/1978 | Lin ............................ | E04H 5/12 |
| | | | | 261/DIG. 11 |
| 4,732,234 | A * | 3/1988 | Brickman ........... | E04G 21/3266 |
| | | | | 182/138 |
| 5,038,540 | A * | 8/1991 | Krautz ................... | E04H 12/28 |
| | | | | 52/245 |
| 7,114,295 | B2 * | 10/2006 | Wobben .................... | E04C 3/22 |
| | | | | 52/40 |
| 7,739,843 | B2 * | 6/2010 | Cortina-Cordero ..... | E04H 12/12 |
| | | | | 416/DIG. 6 |
| 8,555,600 | B2 * | 10/2013 | Cortina-Cordero ..... | E04H 12/16 |
| | | | | 52/123.1 |
| 2005/0129504 | A1 * | 6/2005 | De Roest .............. | E04H 12/085 |
| | | | | 415/4.2 |
| 2006/0156681 | A1 * | 7/2006 | Fernandez Gomez . | E04H 12/02 |
| | | | | 52/837 |
| 2010/0327488 | A1 * | 12/2010 | Ay ........................ | B28B 13/027 |
| | | | | 264/312 |
| 2016/0312431 | A1 * | 10/2016 | Coordes ................. | E04H 12/08 |

FOREIGN PATENT DOCUMENTS

| | | | | |
|---|---|---|---|---|
| EP | 0960986 A3 * | 11/2000 | ............... | E04B 1/34 |
| WO | WO-2016038077 A1 * | 3/2016 | ............. | F03D 13/20 |

* cited by examiner

CABLES LIFT SYSTEM FOR VERTICAL PRE-STRESSING

BACKGROUND OF THE INVENTION

1. Field of the Invention

This description refers to a lifting system of pre-stressing cables inside of ducts in concrete structures. In particular, it relates to a lifting system for pre-stressing cables in concrete structures. More particularly for pre-stressed (pre-stressed) concrete structures of high altitude.

2. General Background

The pre-stressing of concrete structures requires the introduction of pre-stressing cables within ducts that are arranged inside the concrete segments mounted to form the structure. Once arranged the cables inside the ducts, cables are tensioned to exert a compressive force that holds together the concrete segments.

Several pre-stressed concrete structures are known in the art. For example, tanks (U.S. Pat. No. 4,045,929), cooling towers for nuclear reactors (U.S. Pat. No. 4,092,811); Silos (U.S. Pat. No. 1,834,842) chimneys (U.S. Pat. No. 5,038,540) and other elongated structures such as concrete towers or masts. In the case of concrete towers, they can be sectioned towers (EP-0 960 986A2, U.S. Pat. No. 7,114,295) or may be segmented towers (US-2005/0129504 and US-2006/0156681A1), or U.S. Pat. No. 7,739,843 and U.S. Pat. No. 8,555,600 by the same inventors hereof. Pre-stressing concrete structures over 30 meters high, have several drawbacks. In the prior art pre-stressing (post-tensioning) techniques, the pre-stressing cables are inserted into the ducts from the bottom of the structure through the use of motorized roller which force the cables to entry into the ducts and arise. This technique is effective particularly in mid-rise structures, 5-20 meters, however, in the case of structures for nuclear reactors or towers for wind power generators, which reach above 50 m heights, such method has several drawbacks. To reach the required height the motorized rollers require high power motors, due to the long distance the pre-stressing cables must run inside the ducts, it is common for them to jam. The problem is increased if the structure has a reduction of diameter or waist as in the case of nuclear reactors. Another way to place the pre-stressing cables is to upload a cable roll to the top of the structure using a crane, and insert the cable within the pre-stressing ducts. This embodiment involves a number of drawbacks. The handling of the roll is complicated and risky, because the main weight of the cable lies on the roll, but not in the end that is introduced in the duct, so that at all times there is a latent risk that the roll falls under its own weight and drag the cable, tools and operators in the fall. Moreover raising the cable roll carries a cost for the use of the crane that lifts the pre-stress cable roll.

Moreover, the layout of personnel or operators performing the post-tensioning is also a challenge. To perform the post-tensioning, operators should be placed on top of the tower, where the huge concrete blocks are stacked without a firm bond, at a height where there are high speed wind currents. Moreover, if the introduction of the wires is performed from the top of the tower to the bottom, the volume of equipment and pre-stressing cables become more insecure the work of the operators performing the pre-stressing.

A considered solution to this problem consists in placing strands inside the concrete column, adjacent to the interior wall, but not within ducts, see U.S. Patent-2005/0129504, FIG. 15 MECAL APPLIED. Such a solution has various drawbacks, for example, such configuration cannot be considered since the strands have a different nature and function with respect to the pre-stressing cables which are arranged embedded in the concrete structure, within ducts, moreover, the load to be applied to said strands is very low in relation to the loads that can be applied by pre-stressing. The tension collected in the pre-stressing cables ensure that the concrete tower works like a monolithic structure, in other words, as made in one piece.

It is therefore necessary an efficient and safe solution to the problem of lifting cables within ducts of pre-stressed concrete structures, particularly greater than 30 m height, more particularly, structures of between 80 and 150 m.

SUMMARY OF THE INVENTION

A first task of the invention consists in providing an efficient method for pre-stressing concrete structures having high altitudes, particularly greater than 50 m.

Another task of the invention is to provide a pre-stressing system which further provides a safe work environment.

Another task of the invention is to provide an assembly for lifting pre-stressing cables for vertical pre-stressing of concrete structures.

Another task of the invention is to provide a lifting cable system for vertical pre-stressing of concrete structures.

Another task of the invention is to provide a lifting and pre-stressing system of cables in a concrete tower.

Another task of the invention is to provide an assembly for lifting and pre-stressing cables using a nacelle flange of a concrete tower.

Still another task of the invention is to provide a secure assembly for lifting pre-stressing cables to a concrete structure.

The above tasks are achieved by providing an assembly for lifting pre-stressing cables for a pre-stressing concrete structure having ducts for pre-stressing cables, to be disposed on top of the concrete structure, comprising: (a) a rail 22 on which a hoist or pulley 30, which has wheels, is disposed, which allow the hoist 30 to move along the rail 22; (b) a support structure 12, attached to rail 22; (c) a plurality of columns 14, which supports the structure 12 of the support rail 22, arranged at a certain distance from the rail; and (d) an hoists 30 having a chain 34 which is introduced and into the vertical ducts 52 for the pre-stressing cables of the concrete structure, drop to the floor level, and attach and uploads the pre-stressing cable to the top of the structure.

In a preferred embodiment of the invention, the above tasks are achieved by providing an assembly for lifting pre-stressing cables to be disposed on top of a pre-stressing concrete tower having ducts for pre-stressing cables and a nacelle flange 40, said flange including ducts 42 for pre-stressing cables and holes 44 for installing a nacelle, the assembly characterized in that it comprises (a) circulating a rail 22 on which it is railed a hoist, pulley 30 having wheels, which allow the hoist 30 is moved along the rail 22; (B) a support structure 12, attached to rail 22; (C) a plurality of columns 14, which supports the structure 12 of the support rail 22, arranged at a certain distance from the rail; and (d) an hoists 30 having a chain 34 which is introduced and into the vertical ducts 52 for the pre-stressing cables of the concrete structure, drop to the floor level, and attach and uploads the pre-stressing cable to the top of the structure.

BRIEF DESCRIPTION OF THE DRAWINGS

By way of example, reference is now made to the accompanying drawings.

DETAILED DESCRIPTION OF THE INVENTION

The present invention finds application in lifting pre-stressing cables for concrete structures such as tanks, coolers for nuclear reactors and particularly concrete towers. In the case of concrete towers, the invention finds application in elevation of cables and pre-stressing of concrete towers sectioned as those described in U.S. Pat. No. 7,114,295 and EP-0960986A2, made by Enercon; the invention is also applicable to sectional and segmented conical towers, as those described in patents US2006/0156681A1 Acciona Eolica. An especially preferred tower is the triangular tower with a cylindrical extension of the same inventors hereof, which are described in detail in patents (U.S. Pat. No. 7,739,843 and U.S. Pat. No. 8,555,600).

The invention is applicable to concrete towers that are pre-stressed in the upper end of concrete, however, it is preferred that the towers include a flange for nacelle (or power generator) as the advantageous flange also developed by the inventors of the present invention and described in detail in U.S. Pat. No. 8,468,776.

The invention is described with reference to the accompanying drawings which are for illustrative purposes, one skilled in the art will find apparent variations which are considered within the scope of the invention.

Figure 1:
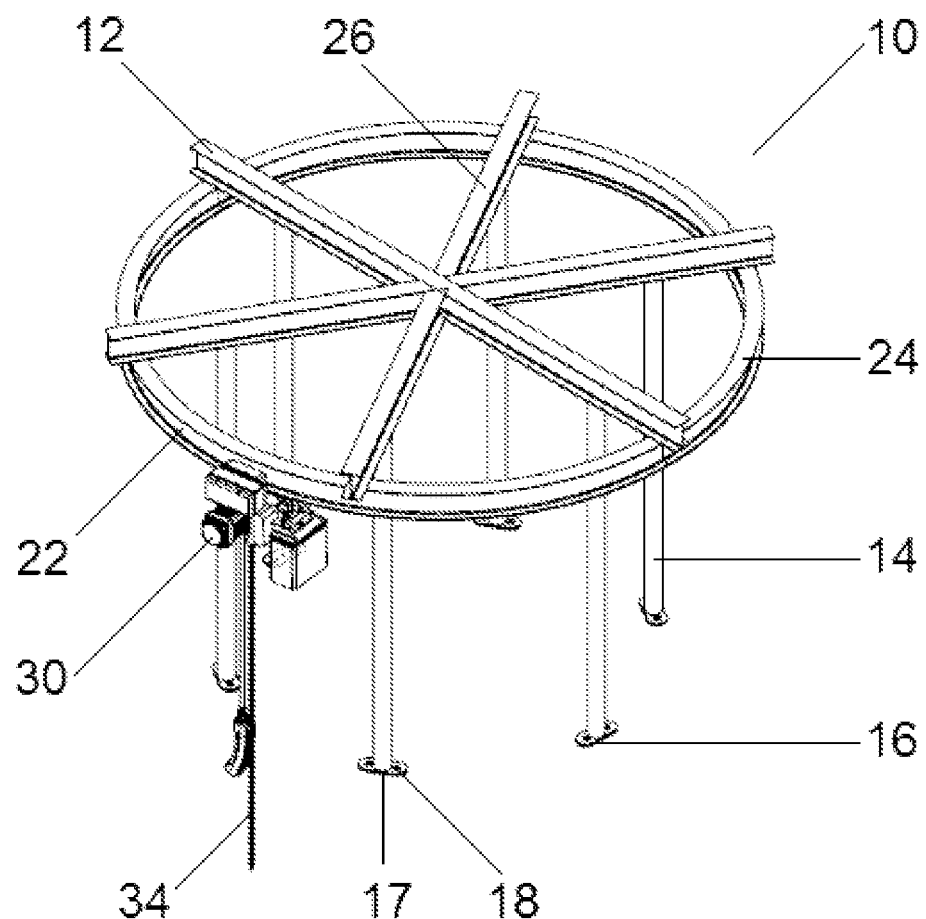
FIG. 1 illustrates an assembly for lifting pre-stressing cables in accordance with the present invention.
Figure 2:
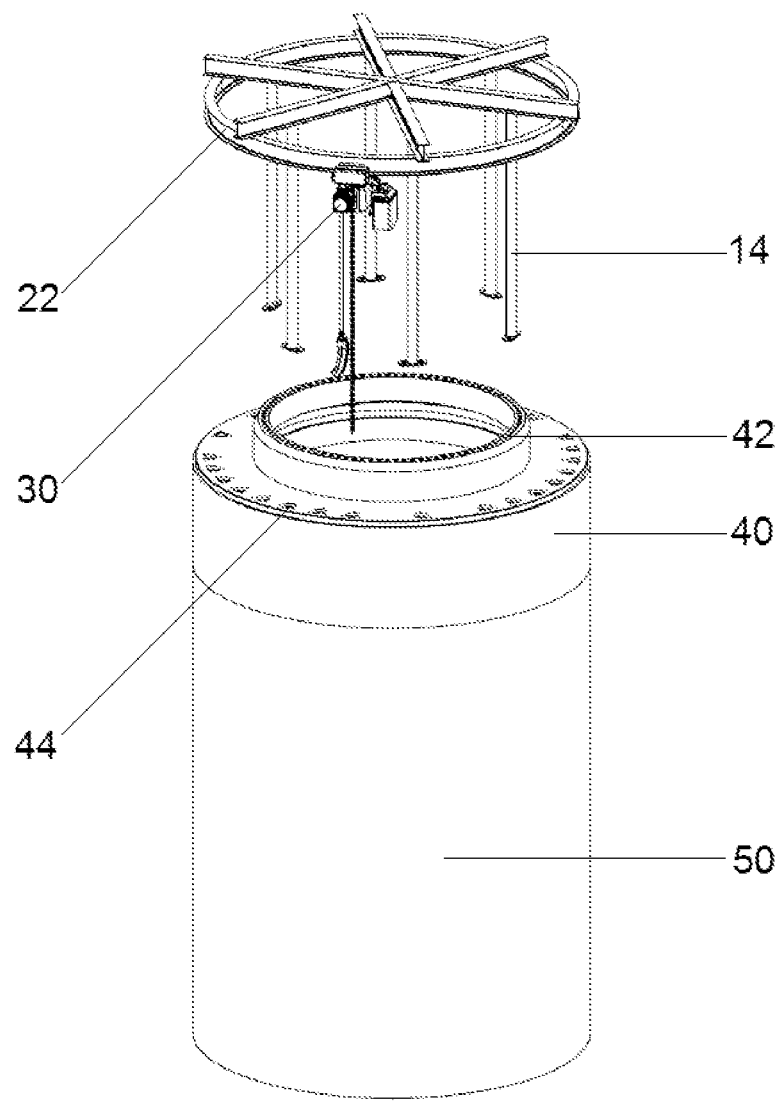
FIG. 2 illustrates an embodiment of the invention wherein the assembly for lifting pre-stressing cables arranged on the flange nacelle a of a pre-stressed concrete tower for a wind power generator

In FIG. 1, it is shown a first embodiment of the assembly 10 for the lifting cable of the present invention. The assembly 10 consists of a rail 22 on which a hoist or pulley 30, having wheels (not shown) such as a wheel shaft, roller bearing, spheres, rollers or carts/wheelbarrow which allow to move the hoist on the rail 22. The rail may have any configuration known in the art to allow movement in the tangential direction, but must include means for preventing displacement in the axial direction (up and down) or radial (into or out) causing the hoist 30 to derailed from the rail 22.

In accordance to the preferred embodiment of the present invention, the rail 22 is selected from an "I" beam or "H" beam consisting of a vertical strip 23a bound to a horizontal upper strip 23b and a lower horizontal strip 23c on which two tracks 23d and 23e are defined to the right and left side of the vertical strip 23a, so that the hoist wheels rest on the respective tracks 23d and 23e of the horizontal strip of the "I" beam (see FIG. 3) and the hoist includes bumps or means to prevent the wheels from losing contact with the tracks.

The geometry of the rail 22 depends on the concrete structure, in the case of tanks and reactors rail takes a geometry of circle segment or even linear. In the case of concrete towers and chimneys may be circular rail proportional to the circumference of the structure. Hereinafter referred to circular rail illustrated in the drawings, but it should be understood that the rail has a geometry which depends on the design of the structure.

Figure 7:
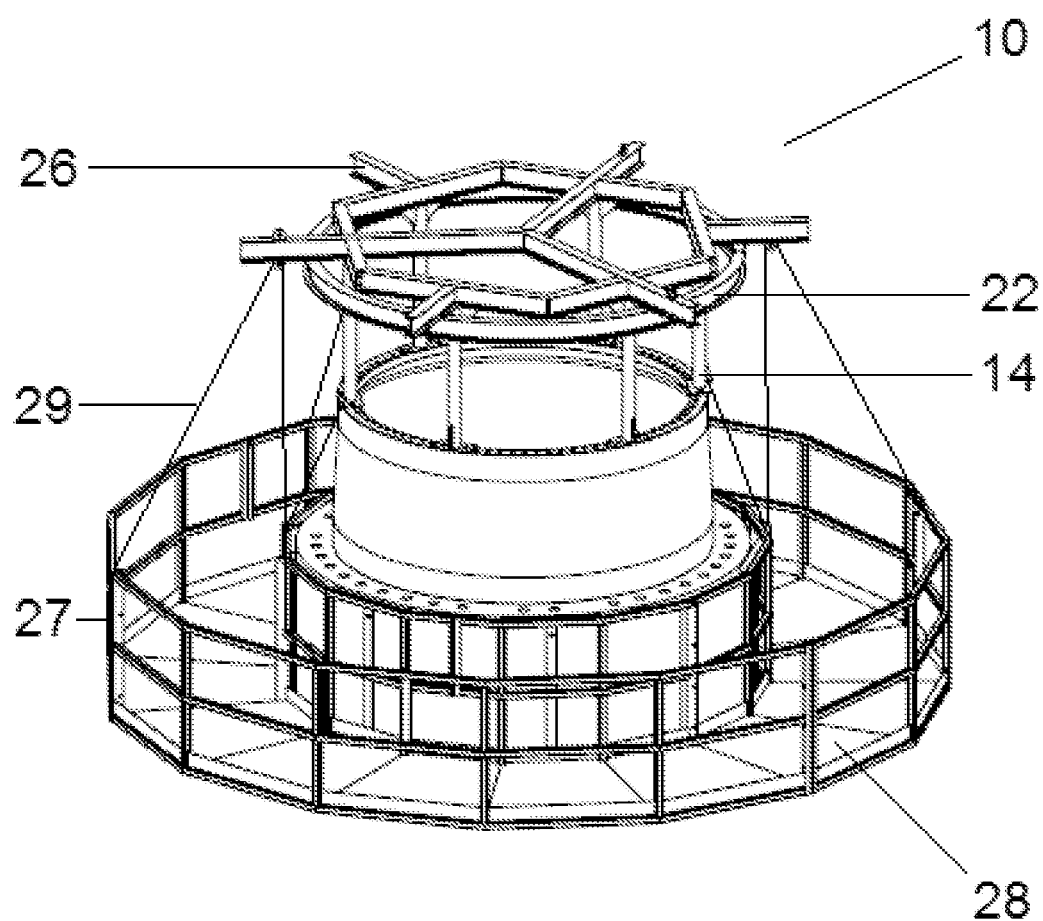
FIG. 7 shows an embodiment assembly for lifting pre-stressing cables which includes an external platform.

The circular rail 22 includes a support structure 12, attached to the circular rail. The support structure is intended to minimize or prevent deformation of the rail by hoist subjected to loads due to the weight of pre-stressing cables, which can reach up to 4 tons. Moreover it aims to hold the circular rail 22. In the embodiment shown in FIGS. 1-4, the support structure consists of a plurality of beams radially arranged, that is, extending outward from the center. However, as will be apparent to one skilled in the art, other configurations are also acceptable, for example, the configuration illustrated in FIG. 7 which shows two concentric polygons.

The supporting structure can be made of any suitable material, for example, beam "I", beam "H" beam or channel "C", angle, or suitable reinforced lightweight materials, for example, laminar rolling structural beams "MONTEN", etc. In the figures, the support structure has been depicted with beams "I". Furthermore, as shown in the figures, the supporting structure 12 is joined to the circular rail, joining by bolting or welding, the upper face of the upper horizontal strip 23b of the circular rail 22 to the respective lower face of the supporting structure beam spliced therewith. This configuration ensures that the hoist can run the entire circular rail path preventing the supporting structure 12 obstacles this displacement.

The assembly 10 of the present invention further includes a plurality of columns 14 supporting the supporting structure 12. In the embodiment of FIGS. 1 to 4 each column is placed under a radial beam of the supporting structure 12 assembly. As shown in the figures, the columns 14 are arranged at a distance from the circular rail 22 so that they do not hinder the movement of the hoist 30.

Figure 3:
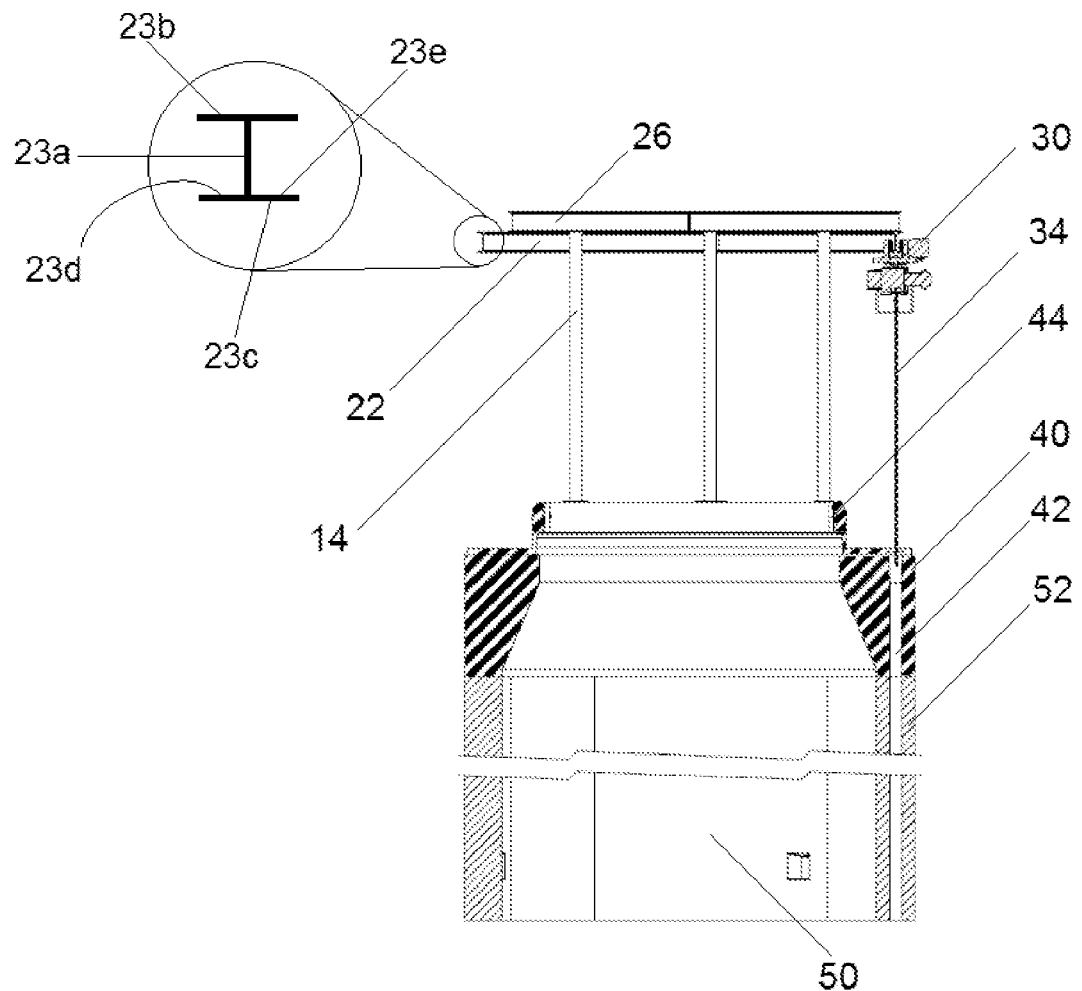
FIGS. 3 and 4 illustrate respectively a perspective view and side sectional of the assembly for lifting the pre-stressing cables arranged on the flange nacelle of a pre-stressed concrete tower for a wind power generator.
Figure 4:
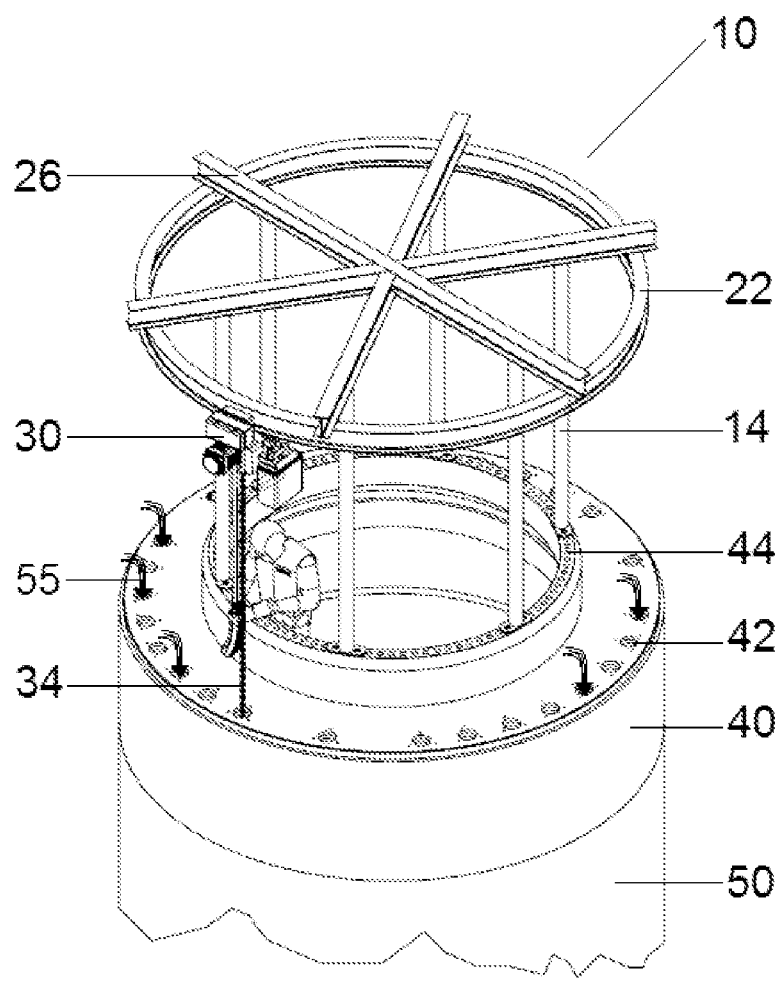

In the preferred embodiment of the invention the assembly 30 for the lifting of cables is designed to engage to the nacelle flange 40. The flange for nacelle is described in detail in U.S. Pat. No. 8,468,776 B2 which is incorporated herein in its entirety by reference. The nacelle flange is a steel unit including a plurality of ducts or holes 42 for incorporating pre-stressing cables, so that the flange 40 is attached to the tower by pre-stressing cables (and other means not shown as anchors) to ensure a firm union with the concrete structure. The nacelle flange 40 further includes a plurality of holes 44 for introducing bolts or screws by which the nacelle (not shown) is attached to the flange 40. According to the present invention, it is possible to adjoin columns 14 of assembly 10 using the holes 44 of the nacelle flange 40. To this end in the lower end of each column in the lower end of each column 14 it is arranged a plate 17 including holes 18. As shown in FIGS. 3 and 4, the holes 18 of the plates 17 of the columns 14 are collinear with respective holes 44 of the nacelle flange 40. To join the assembly 10 for lifting cables to the nacelle flange 40 screws or bolts are introduced passing through holes 18 and 44, the respective nuts are placed and thus the assembly 10 becomes firmly joined the nacelle flange 40. Once the post-tensioning of the tower or structure is performed, then the screw or bolts are removed, and the assembly 10 is separated and removed from the pre-stressed structure.

In a preferred embodiment of the invention, it is preferred to mount at ground level, the assembly 10 on the nacelle flange 40. Once mounted, the nacelle flange 40 is place on the top of the tower. It is preferred to maintain the flange nacelle on the crane, so that if the tower collapses, operators are kept safe.

Figure 5:
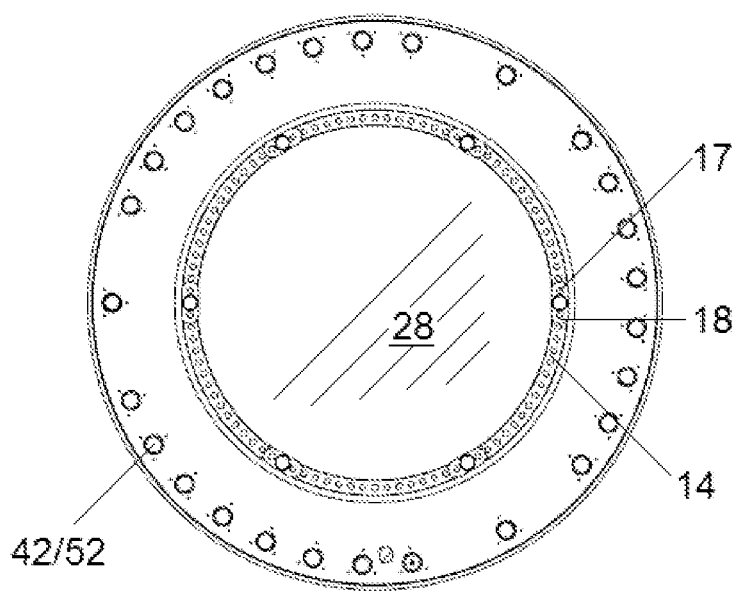
FIG. 5 illustrates a top view of a tower showing the holes in the flange nacelle.
Figure 6:
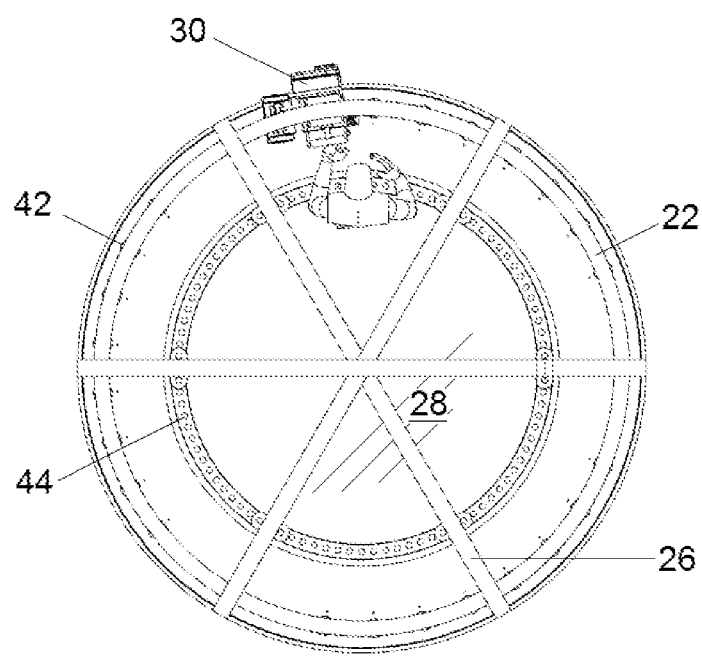
FIG. 6 illustrates a top view of a tower where a lifting assembly of pre-stressing cables and an internal platform are arranged.

In an embodiment of the invention shown in FIGS. 5 and 6, a platform is arranged 28 installed on the nacelle flange 40. This platform 28 provides a firm floor for operators to stand on. As shown in FIGS. 1 to 6, the platform 28 is disposed within the nacelle flange 40 so that the circumference of the flange is a guardrail which prevents operators from falling. In another embodiment of the invention shown in FIG. 7, an external platform structure is provided with a guardrail or cage that prevents operators from falling. The platform has an annular shape so that the central portion is arranged around the flange nacelle or the upper segment of the concrete structure to introduce pre-stressing cables and then make the post-tensing of the tower, as indicated before, the top part of the tower is the flange nacelle. Moreover, as noted in FIG. 7, the assembly includes support braces 29 in order to support the outer platform 27.

Figure 8:
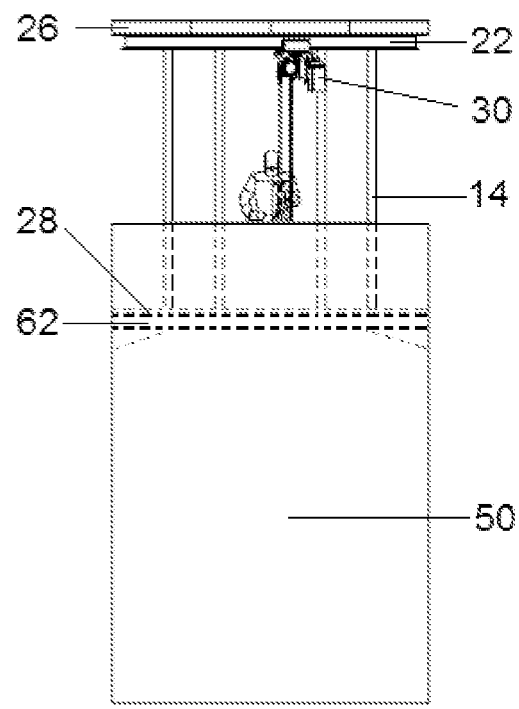
FIG. 8 shows an alternative embodiment of the invention wherein the assembly for lifting pre-stressing cables is disposed in the upper end of the concrete tower around the internal wall.
Figure 9:
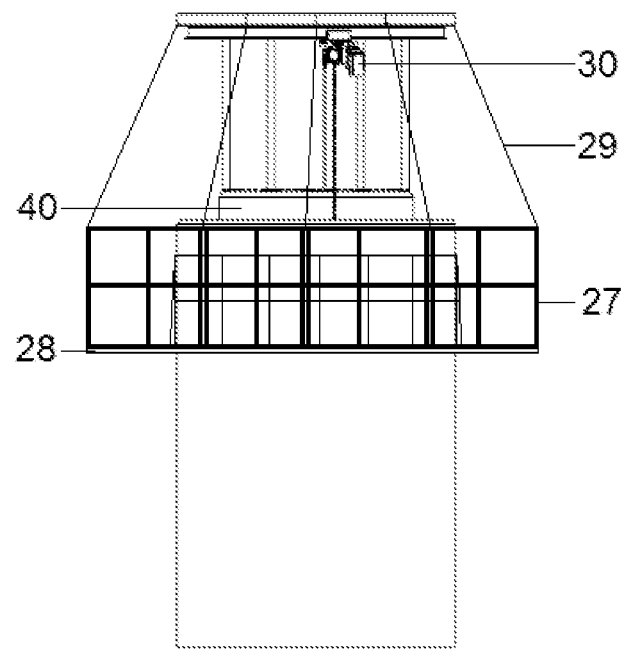
FIG. 9 shows an alternative embodiment of the invention wherein the assembly for lifting pre-stressing cables is disposed in the upper end of the concrete tower around the external wall.

In another embodiment of the invention shown in FIG. 8, the tower does not include a nacelle flange. In this configuration, a beam structure 62 which rests on hole through the inner walls of concrete segment that constitutes the top of the tower is arranged. Then, on said beam structure a platform 62 is arranged as well as a mounting 10 for lifting cable with the features of the present invention, although with columns 14 with are comparatively longer.

The hoist or pulley 30 is a tool or appliances well known in the art. Preferably the hoist or pulley include operational electromechanical means to move the hoist in the path of the circular rail 22 and to allow the ascent and descent of the chain. While in use, an operator inserts the chain 34 in the ducts or holes 42 of the flange that are aligned with the respective ducts 52 of the concrete structure for the pre-stressing cables along the tower, until the chain emerges at the lower end of the tower, for example at the base of the tower or foundation therefrom. Then the pre-stress cable 55 is attached to the chain and through the mechanism 23 ascent/descent of the hoist or pulley the pre-stressing cable is upload to the top of the tower where suitable anchors and wedges are placed in a way well known in the art. In FIG. 4 it is shown the pre-stressing cables that have been anchored and where the wedges have been placed. After inserting the wedges and anchors on the upper side of the structure, it is proceed as appropriate, to cut the pre-stress cable and stress the same pulling for the lower side of the structure using a suitable tool, and finally to put the wedges and anchors on the cable at the bottom side of the structure.

The hoist is a well known tool in the technique. It is preferred to use a hoist having a load capacity between 1 and 5 tons, preferably 3 tons. As it would be evident to one skilled in the art, the hoist capacity varies depending on the design of pre-stressed concrete structure. Due to the high cost of hoists, it is preferred to perform the lifting cables with a single hoist equipment. The circular rail 22 allows the hoist 30 can access to the position of all and each of the ducts 42 (and 52 aligned) for the pre-stress cables and allow ascent of the respective pre-stressing cable. However, as will be evident to one skilled in the art, optionally it can be arranged two, three, four or more hoists 30 which are operated by a respective number of operators. Using more hoists results in faster installation of pre-stressing cables and consequent post-tensioning thereof.

Los cables de pre-esfuerzo son bien conocidos en la materia. Sin embargo se prefiere utilizar cables con las especificaciones indicadas en la tabla siguiente.

| Cable resistance | $f_{pu}$ = 270 KSI (1,860 MPa) |
|---|---|
| Diameter and threads | 0.6 inches (15.24 cm) in diameter with 7 threads of low relaxation |
| Effective tensile stress of strands | $f_{se}$ = 1,100 MPa |

Once the lifting of the cables is done, the assembly 10 is removed. As the assembly 10 is not under damage conditions, then it can be advantageously installed for use on the following structure. This is particularly useful in the case of assemblies is towers for a wind energy field where several towers are mounted.

The foregoing description and drawings relate to the main application of the invention in the lifting of the pre-stressing cables to elongated structures, however, as it will be evident to one skilled in the art, the assembly can also be applied to other structures for example tanks and coolers for nuclear reactors. In this case, for design considerations, the assembly may not extend over the entire top surface of the structure, for such cases the rail is designed as a segment covering a particular circular segment of the structure. In the case of tanks and coolers for nuclear reactors, the assembly must be braced and mounted to the structure.

Moreover, the description includes any combination or sub combination of elements of different types and/or embodiments described herein. A skilled in the art person will recognize that these characteristics, and therefore the scope of this disclosure should be interpreted in the light of the following claims and any equivalents thereof.

LIST OF PARTS

10 Assembly for lifting cable
12 Supporting structure
14 Columns
16 Column mounting bracket
17 Plate
18 Plate holes
22 Rail
23a Vertical strip
23b Upper horizontal strip
23c Lower horizontal strip
23d Right track
23e Left track
24 Cart
26 Horizontal support beams
27 External platform
28 Platform
29 Support strands
30 Hoist/pulley
32 Ascent/descent mechanism of chain
34 Chain
36 On track displacement system
40 Nacelle flange
42 Ducts/holes for pre-stress cable
44 Holes for fastening bolts of nacelle flange 50 Concrete tower
52 Pre-stressing cable ducts
55 Pre-stressing cables
62 platform Support

The invention claimed is:

1. An assembly for lifting pre-stressing cables for a pre-stressed concrete structure having ducts for pre-stressing cables, to be disposed on top of the concrete structure, comprising:
   a rail (22), on which a hoist or pulley (30) is arranged which has wheels, that allow the hoist or pulley (30) to move along the rail (22);
   a support structure (12), attached to the rail (22);
   a plurality of columns (14), which supports the supporting structure (12) of the rail (22), arranged at a certain distance from the rail; and
   the hoist or pulley (30) having a chain (34) which is inserted into vertical ducts (52) for the pre-stressing cables of the concrete structure, and uploads the cables to the top of the structure.

2. The assembly for lifting pre-stressing cables in accordance with claim 1, further comprising a platform placed inside or outside of the concrete structure.

3. The assembly for lifting pre-stressing cables in accordance with claim 1, wherein the concrete structure is selected from a pre-stressed concrete tower for a wind generator, a fireplace, a cooler of a nuclear reactor and a tank.

4. An assembly for lifting pre-stressing cables to be arranged on top of a pre-stressed concrete tower comprising pre-stress cable ducts and a nacelle flange (40), said flange including ducts (42) for pre-stress cables and holes (44) for installing a nacelle, wherein the assembly comprising:
   a circular rail 22, on which a hoist or pulley (30) is provided, which has wheels, which allow the hoist or pulley (30) to move along the rail (22);
   a support structure (12), attached to the rail (22);
   a plurality of columns (14), which supports the support structure (12) of the rail (22), arranged at a given distance from the circular rail; and
   the hoist or pulley (30) having a chain (34) which is inserted into vertical ducts (52) for the pre-stressing cables of the concrete structure, and raises the pre-stressing cables to the top of the structure.

5. The assembly for lifting pre-stressing cables, in accordance with claim 4, wherein the columns (14) are detachably coupled to a nacelle flange (40), by screws or bolts that are inserted in the holes (44) for nacelle and respective holes (18) arranged on a plate (17) attached to a lower end of the columns (14).

6. The assembly for lifting pre-stressing cables in accordance with claim 4, wherein the support structure (12) consists of a plurality of beams arranged radially.

7. The assembly for lifting pre-stressing cables in accordance with claim 4, wherein the support structure (12) consists of two concentric polygons of beams.

8. The assembly for lifting pre-stressing cables in accordance with claim 4, wherein further comprising a platform placed inside the flange nacelle.

9. The assembly for lifting pre-stressing cables in accordance with claim 4, wherein further comprising a platform with a guardrail or cage positioned outside the nacelle flange and attached to a mounting through strands.

10. A method for the vertical pre-stressing of concrete structures having a plurality of vertical ducts for pre-stressing cables, comprising:
   a) providing a cable lifting assembly, in the upper portion of the concrete structure, comprising:
      a circular rail (22), on which a hoist or pulley (30) is arranged, which has wheels, that enable the hoist or pulley (30) to move along the rail (22);
      a support structure (12), attached to the rail (22);
      a plurality of columns (14), which supports the support structure (12) of the rail (22), arranged at a certain distance from the rail; and
      the hoist or pulley (30) having a chain (34) which is introduced in a vertical duct (52) for the pre-stressing cables of the concrete structure;
   b) introducing the chain (34) in the vertical duct until the chain emerges at a lower end of the duct;
   c) securing a pre-stressing cable to an end of the chain;
   d) raising the pre-stressing cables through the hoist to the top of the structure;
   e) anchoring and positioning a wedge at an upper end of the pre-stressing cable; and
   f) post-tensioning the pre-stressing cable pulling a cable end on a lower side, and anchoring a lower end of the pre-stressing cable.

11. The method for the vertical pre-stressing of concrete structures according to claim 10, wherein the cable lifting, assembly further comprises a platform placed inside or outside of the concrete structure.

12. The method for the vertical pre-stressing of concrete structures according to claim 10, wherein the structure is a pre-stressed concrete tower for wind generators including a nacelle flange (40) which includes ducts (42) for pre-stressing cable and a ring of holes (44) for installing a nacelle.

13. The method for the vertical pre-stressing of concrete structures according to claim 12, wherein the cable lifting assembly engages the ring of holes (44) of the flange nacelle.

14. The method for the vertical post-tensing of concrete structures according to claim 10, wherein the concrete structure is selected from a chimney, a nuclear reactor coolant and/or a tank.

* * * * *